United States Patent

Mutsuno

(10) Patent No.: US 9,432,530 B2
(45) Date of Patent: Aug. 30, 2016

(54) IMAGE FORMING APPARATUS, METHOD OF CONTROLLING THE SAME, AND STORAGE MEDIUM

(71) Applicant: CANON KABUSHIKI KAISHA, Tokyo (JP)

(72) Inventor: Masahiro Mutsuno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/568,871

(22) Filed: Dec. 12, 2014

(65) Prior Publication Data

US 2015/0181057 A1 Jun. 25, 2015

(30) Foreign Application Priority Data

Dec. 20, 2013 (JP) .................. 2013-264504

(51) Int. Cl.
*H04N 1/00* (2006.01)
*H04L 29/08* (2006.01)
*G03G 15/00* (2006.01)

(52) U.S. Cl.
CPC ...... *H04N 1/00344* (2013.01); *G03G 15/5079* (2013.01); *H04N 1/00925* (2013.01); *H04N 1/00928* (2013.01); *G03G 2215/00109* (2013.01)

(58) Field of Classification Search
CPC ............. G06F 11/0709; G06F 21/552; G06F 13/385; G06F 1/24; G06F 21/305; G06F 21/575; G06F 21/62; G06F 21/6218; G06F 3/0622; G06Q 10/10; H04L 41/0213; H04L 41/06; H04L 41/5003; H04L 41/5009; H04L 41/5054; H04L 41/5064; H04L 41/5074; H04L 43/16; H04N 2201/0039; H04N 2201/0075; H04N 2201/0094; H04N 67/10; H04N 1/00007; H04N 1/00061; H04N 1/00084; H04N 1/00928; H04N 1/00344; H04N 1/00925; G03G 15/5079; G03G 2215/00109
USPC ........................................ 358/1.14
See application file for complete search history.

(56) References Cited

U.S. PATENT DOCUMENTS

| | | | | |
|---|---|---|---|---|
| 5,216,706 | A * | 6/1993 | Nakajima | .......... H04N 1/32771 379/102.02 |
| 2005/0257041 | A1* | 11/2005 | Wallenstein et al. | .............. 713/2 |
| 2008/0256630 | A1* | 10/2008 | Fujikawa | ........... H04N 1/00411 726/21 |
| 2015/0049363 | A1* | 2/2015 | Nishiyama | ............ G06F 3/1236 358/1.15 |

FOREIGN PATENT DOCUMENTS

| | | | |
|---|---|---|---|
| JP | 2005-208974 A | 8/2005 | |
| JP | 2005208974 | * 8/2005 | ............. G06F 15/00 |

OTHER PUBLICATIONS

JP2005208974, english machine translation.*

* cited by examiner

*Primary Examiner* — Iriana Cruz

(74) *Attorney, Agent, or Firm* — Fitzpatrick, Cella, Harper & Scinto

(57) ABSTRACT

An image forming apparatus, upon a restart, does not activate, if an accepted restart instruction is not an instruction by a remote control accepted from an information processing apparatus, an application for remotely controlling the image forming apparatus from the information processing apparatus, and, upon a restart, does activate, if the restart instruction is an instruction by the remote control, the application.

6 Claims, 8 Drawing Sheets

F I G. 1
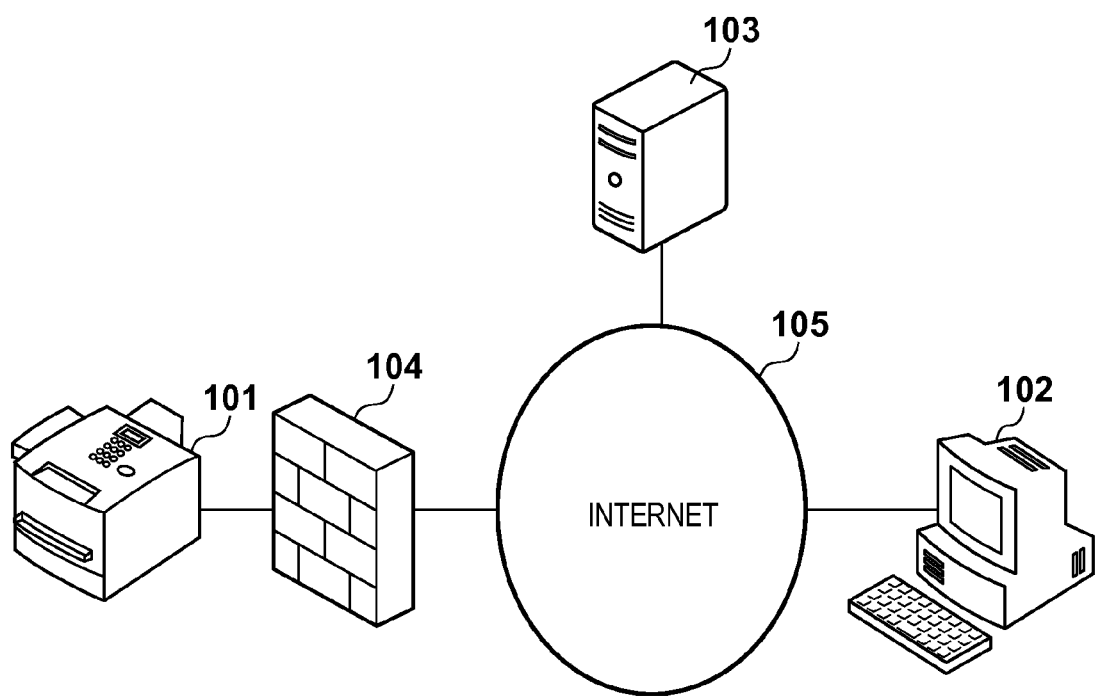

IMAGE FORMING APPARATUS, METHOD OF CONTROLLING THE SAME, AND STORAGE MEDIUM

BACKGROUND OF THE INVENTION

1. Field of the Invention

The present invention relates to an image forming apparatus that uses a remote maintenance service, a method of controlling the same, and a storage medium.

2. Description of the Related Art

In Japanese Patent Laid-Open No. 2005-208974, a remote maintenance service performed by audio and moving image communication and remote control for a multi function peripheral is proposed. In the remote maintenance service, it is possible to solve a problem upon an error occurrence on the multi function peripheral by a call-center conveying an error solving approach directly to a user without a worker (hereinafter referred to as a serviceman) going to a site in order to perform maintenance. With this, it becomes possible to shorten the time required to resolve the error. In this kind of remote maintenance service, it is effective to realize a connection to the call-center using communication means of the multi function peripheral without the user using an apparatus other than the multi function peripheral such as a telephone device or a PC. In general, a connection from the Internet towards an information terminal that is blocked by a firewall is restricted. Meanwhile, a connection to the Internet from the information terminal side that is within the firewall is permitted if HTTP which has a high affinity with the firewall is used. Thus, with two information terminals blocked by firewalls, it is possible to realize a session establishment between the information terminals by performing connections from each of the information terminal sides to a relay server to which connection as an HTTP client is possible. By using such communication means, it becomes possible for a user to use a call-center at a wider range if an environment is such that connection to the Internet is possible.

However, there is a problem with the above described conventional technique as recited below. For example, in a remote maintenance service, there are cases in which a restart of the multi function peripheral is performed by an instruction or an operation from a call-center side depending on the maintenance contents or the trouble contents. For example, in a case where a setting modification is performed where the setting becomes enabled after the restart, or in a case when there is a device glitch, the restart of the multi function peripheral is performed. Meanwhile, in the remote maintenance service, various operations of the multi function peripheral can be performed remotely including those that are used from the viewpoint of maintenance. Accordingly, from the viewpoint of security, an operation may be performed remotely at a timing at which a user is conscious of a maintenance service, but it is desirable to avoid continuing a remote maintenance at a timing when the user is not conscious of the maintenance service. In a case where a remote maintenance service is executed using the above described conventional techniques, after the multi function peripheral is restarted, a remote maintenance service application is continuously activated, and there is a possibility that the remote maintenance service will be continued even at a timing other than that which the user intends.

SUMMARY OF THE INVENTION

The present invention enables realization of an arrangement in which after a restart of an image forming apparatus, a remote maintenance service application activates only when necessary.

One aspect of the present invention provides an image forming apparatus, comprising: an acceptance unit configured to accept a restart instruction of the image forming apparatus; and a control unit configured to control so as to, upon a restart, not activate, if the restart instruction accepted by the acceptance unit is not an instruction by a remote control accepted from an external apparatus, an application for remotely controlling the image forming apparatus from the external apparatus, and so as to, upon a restart, activate, if the restart instruction is an instruction by the remote control, the application.

Another aspect of the present invention provides a method of controlling an image forming apparatus, the method comprising: accepting a restart instruction of the image forming apparatus; and controlling so as to, upon a restart, not activate, if the restart instruction accepted in the accepting is not an instruction by a remote control accepted from an external apparatus, an application for remotely controlling the image forming apparatus from the external apparatus, and so as to, upon a restart, activate, if the restart instruction is an instruction by the remote control, the application.

Still another aspect of the present invention provides a non-transitory computer-readable storage medium storing a program for causing a computer to function as the image forming apparatus.

Further features of the present invention will be apparent from the following description of exemplary embodiments with reference to the attached drawings.

BRIEF DESCRIPTION OF THE DRAWINGS

FIG. 1 is a view for illustrating a system configuration in an embodiment.

DESCRIPTION OF THE EMBODIMENTS

Figure 2:
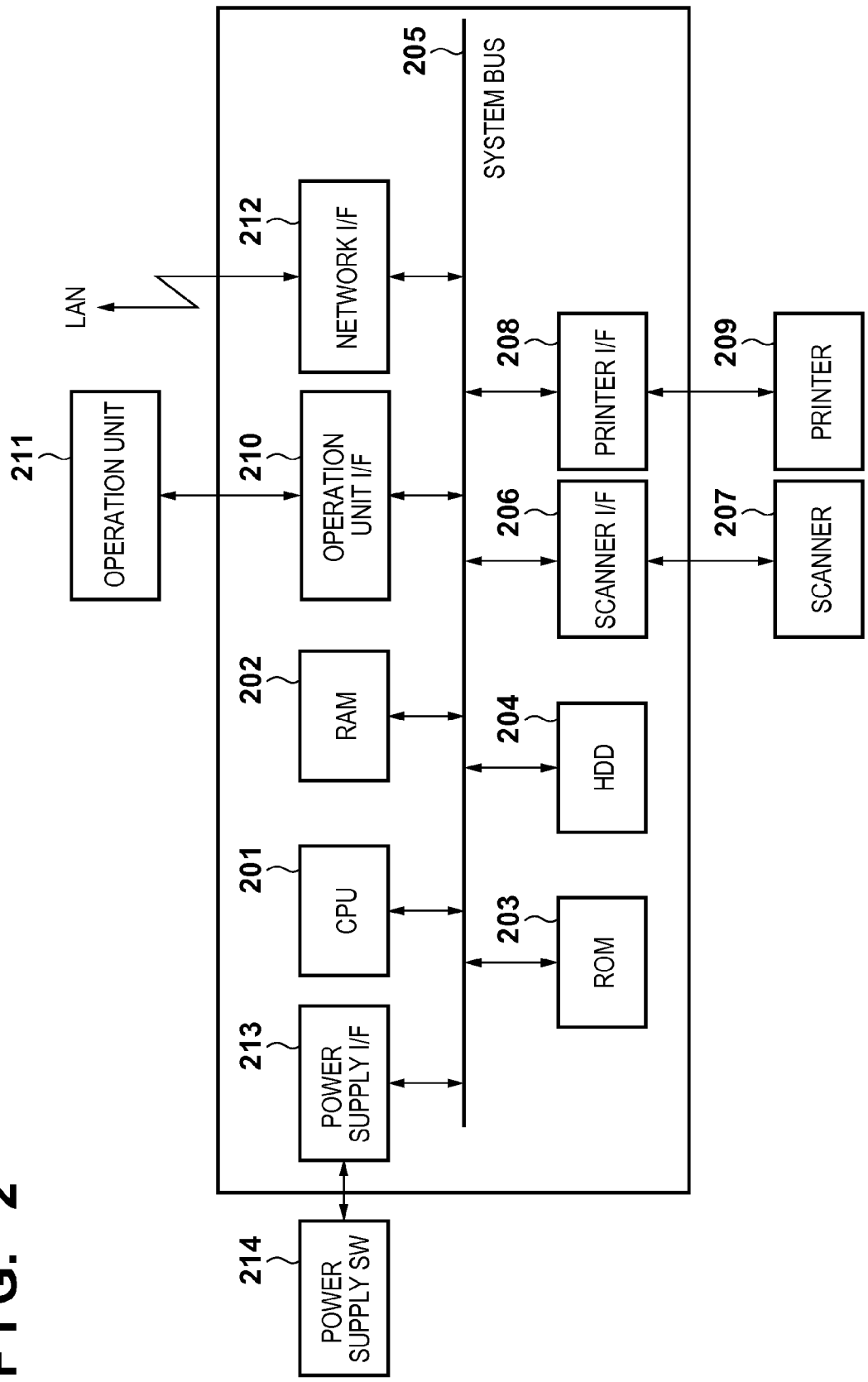
FIG. 2 is a view for illustrating a hardware configuration in an embodiment.

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<System Configuration>

Below, explanation will be given for an embodiment of the present invention with reference to FIG. 1 through FIG. 9. Firstly, explanation will be given for a configuration of a remote maintenance system according to the embodiment with reference to FIG. 1.

The remote maintenance system according to the embodiment is comprised of an image forming apparatus 101, a call-center terminal (an information processing apparatus) 102, and a relay server 103, and each apparatus is connected communicatively via the Internet 105. The image forming apparatus 101 and the call-center terminal 102, which are apparatuses to which the present invention is applied, have a remote maintenance function (a maintenance function) of audio and moving image communication, remote control, and the like, and operate as communication partners upon a remote maintenance. The relay server 103 is provided with an HTTP server communication function. The relay server 103 performs a session management between the image forming apparatus 101 and the call-center terminal 102. Here, an example in which a single image forming apparatus is included is shown, but the present invention is not limited to this, and a plurality of image forming apparatuses may be included.

The image forming apparatus 101 and the call-center terminal 102 are provided with HTTP client communication functions. The image forming apparatus 101 makes an HTTP connection with the relay server 103 over the Internet 105 through a firewall 104. The call-center terminal 102, similarly, makes an HTTP connection with the relay server 103. The image forming apparatus 101, via the relay server 103, performs data transmission and receiving with the call-center terminal 102.

The call-center terminal 102 according to the embodiment is a terminal that a maintenance operator of the call-center operates and is an image forming apparatus that is for maintenance. The call-center terminal 102 performs the role of performing remote maintenance on the image forming apparatus 101 by audio and moving image communication and remote control. Note, in this embodiment, an HTTP protocol is used for the connection between the image forming apparatus 101 and the relay server 103, but another communication protocol that has a high affinity with the firewall 104 may also be used. Note, in this embodiment, an HTTP protocol is used for the connection between the call-center terminal 102 and the relay server 103, but another communication protocol may be used. Note, in this embodiment, data transmission and receiving between the image forming apparatus 101 and the call-center terminal 102 may be performed by separately establishing a communication path that makes a direct connection from the image forming apparatus 101 to the call-center terminal 102 via the relay server 103.

<Image Forming Apparatus Hardware Configuration>

Next, explanation will be given for a hardware configuration of the image forming apparatus 101 according to the embodiment with reference to FIG. 2. The image forming apparatus 101 is equipped with a CPU 201, a RAM 202, a ROM 203, an HDD 204, a scanner I/F (interface) 206, a scanner 207, a printer I/F 208, a printer 209, an operation unit I/F 210, an operation unit 211, a network I/F 212, a power supply I/F 213, and a power supply SW 214.

The CPU 201 performs overall control of access to various devices connected to a system bus 205 based on control programs stored in the ROM 203 or a storage unit of the hard disk drive (HDD) 204. The ROM 203 stores control programs that the CPU 201 is capable of executing. The RAM 202 mainly functions as a main memory, a work area, or the like, of the CPU 201, and configuration is taken such that a memory capacity can be extended by an option RAM connected to an expansion port (not shown). The HDD 204 stores a boot program, various applications, font data, user files, edit files, or the like. Note, in this embodiment, the HDD 204 is used, but other than the HDD 204 an SD card, or a flash memory may be used as an external storage apparatus.

The scanner I/F 206 controls image input from the scanner 207. The printer I/F 208 controls image output to the printer 209. The operation unit I/F 210 performs display control of the operation unit 211, and controls inputting of various setting information set by the operation unit 211. Reference numeral 212 is a network I/F which performs data communication with an external network via a network cable. The power supply I/F 213 is a power supply I/F which receives signals from the power supply SW 214, and performs power supply control of the image forming apparatus 101.

<Image Forming Apparatus Software Configuration>

Figure 3:
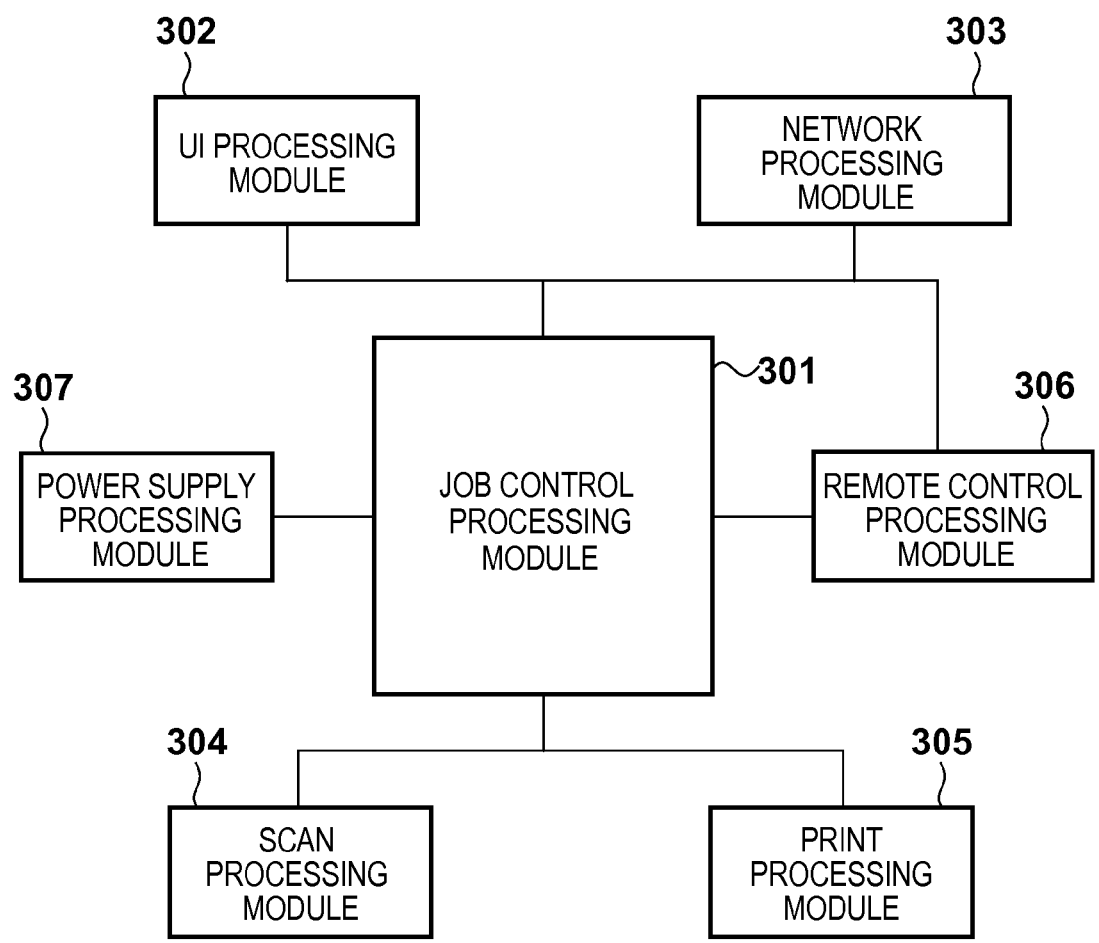
FIG. 3 is a view for illustrating a software configuration in an embodiment.

Next, explanation will be given for a software configuration of the image forming apparatus 101 according to the embodiment with reference to FIG. 3. Each software module shown here is operated mainly by the CPU 201. A job control processing module 301 controls comprehensively software modules shown graphically and not shown, and performs control of various jobs that are generated within the image forming apparatus such as those for copying, printing, scanning, and UI processing.

A UI processing module 302 performs control mainly for the operation unit 211 and the operation unit I/F 210. In addition to notifying the job control processing module 301 of contents of operations that the operator performed on the operation unit 211, the UI processing module 302 controls the display contents of display screens on the operation unit 211 based on instructions from the job control processing module 301. Also, it controls editing of rendering data for display to the operation unit 211.

A network processing module 303 is a module, for controlling communication with an external unit which is performed via the network I/F 212 mainly, which performs communication control for communication with various devices on a LAN. The network processing module 303 makes a notification to the job control processing module 301, when it receives a control command or data from a device on the LAN, of the content of what is received. Also, based on an instruction from the job control processing module 301, it performs transmission of a control command or data to a device on the LAN.

A scan processing module 304, based on an instruction of the job control processing module 301, makes an instruction for reading an original placed on the scanner 207 by controlling the scanner 207 and the scanner I/F 206. A print processing module 305, based on instructions of the job control processing module 301, performs print processing for designated images by controlling the printer 209 and the printer I/F 208.

A remote control processing module 306, in accordance with call-center connection information settings stored in the HDD 204, acquires a URL of the relay server 103, and via the network processing module 303 makes a connection to the relay server 103. In an established session, via the network processing module 303, the remote control processing module 306 performs data transmission and receiving by audio, moving image and remote control. Also, the remote control processing module 306 analyzes data received via the network processing module 303, and performs control of the UI processing module 302 as necessary.

A power supply processing module 307 receives a signal from the power supply SW 214 via the power supply I/F 213, notifies the job control processing module 301, and executes shutdown or restart processing. Also, based on an instruction from the job control processing module 301, it performs shutdown processing or restart processing, and disconnects the power supply.

<Communication Processing>

Figure 4:
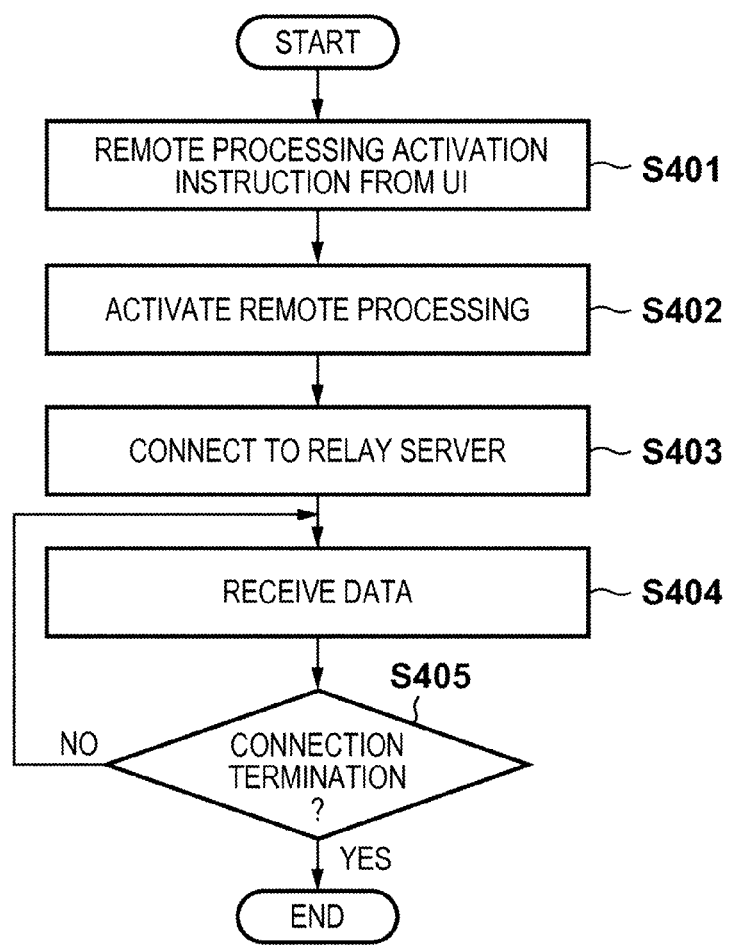
FIG. 4 is a view for illustrating a remote processing flowchart in an embodiment.
Figure 5:
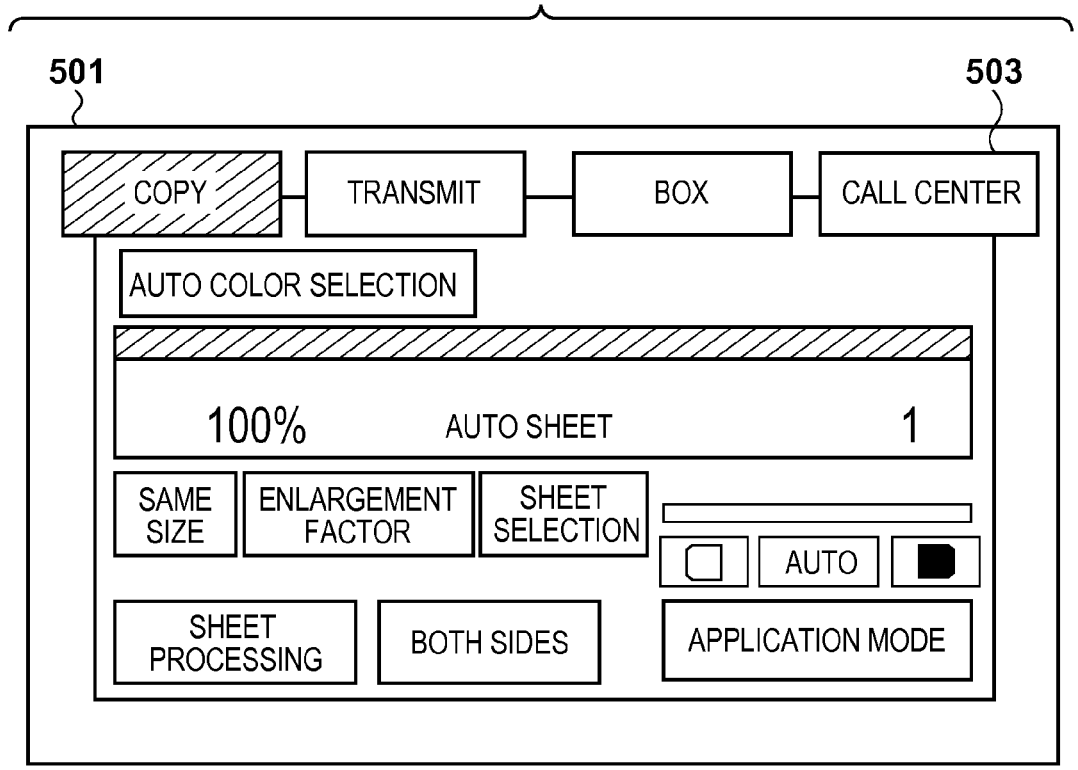
FIG. 5 is a view for illustrating a display to an operation unit in an embodiment.
Figure 5:
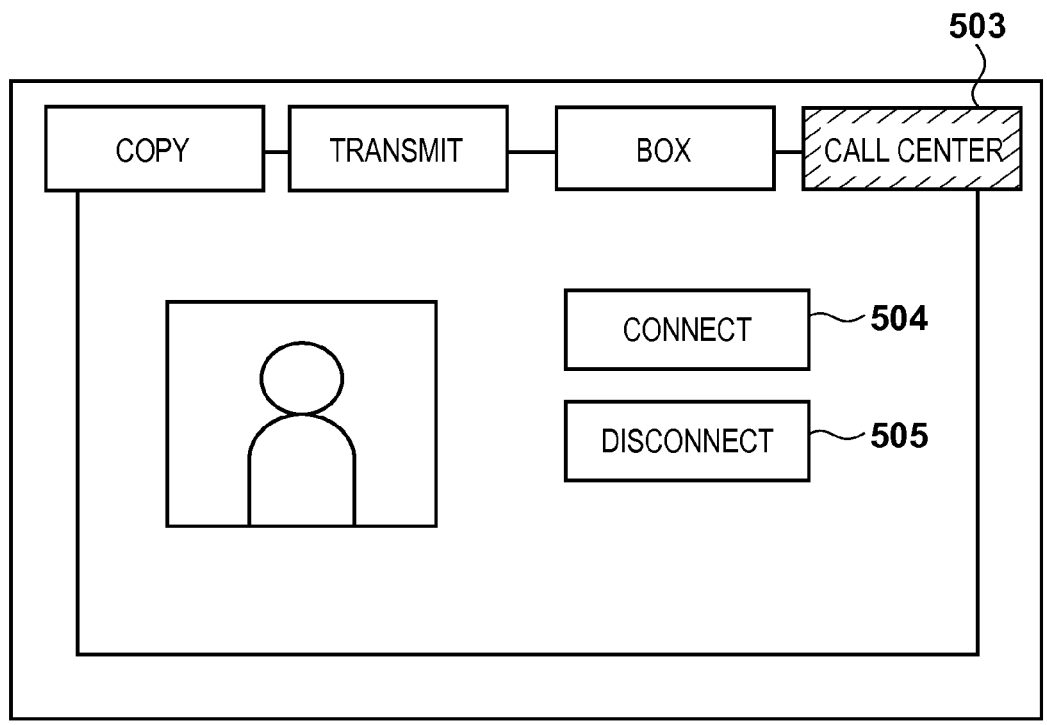

Next, with reference to FIG. 4 and FIG. 5, explanation will be given for a processing procedure for communication processing in the image forming apparatus 101 for communication with the call-center terminal 102 via the relay server 103, and examples of screens. The processing explained below is realized by a program stored in the HDD 204 being read out into the RAM 202, and executed by the CPU 201.

Firstly, in step S401, the UI processing module 302, upon acceptance from the operation unit 211, notifies the job control processing module 301 of an activation instruction of the remote control processing module 306. Next, with reference to FIG. 5, explanation will be given for screens displayed to the operation unit 211. Reference numeral 501 denotes a copy screen displayed to the operation unit 211. Reference numeral 503 denotes a call-center button; when selected, the remote control processing module 306 is activated, and a calling of a call-center is performed. Reference numeral 504 denotes a connection button for connecting to the call-center; when selected, the call-center terminal 102 is connected to via the relay server 103. Reference numeral 505 denotes a disconnection button; when selected, a connection to the call-center terminal 102 is disconnected.

The explanation will now return to FIG. 4. In step S402, the job control processing module 301, in accordance with the activation instruction accepted in step S401, activates the remote control processing module 306. The remote control processing module 306 reads out the URL of the relay server 103 from the HDD 204, and makes an HTTP connection to the relay server 103. In step S403, the remote control processing module 306 transmits to the relay server 103, and establishes a session with the call-center terminal 102.

In step S404, the remote control processing module 306, transmits and receives, with the call-center terminal 102, audio, moving image, or remote control data via the network processing module 303 in the session established in step S403. With this, remote control is initiated between the user of the image forming apparatus 101 and a reception operator of the call-center terminal 102. In step S405, the remote control processing module 306 terminates the processing if a connection termination for the connection between the relay server 103 and the call-center terminal 102 is instructed. If not terminated, data is transmitted and received between the relay server 103 and the call-center terminal 102.

<Restart Processing>

Next, with reference to FIG. 6 through FIG. 9, explanation will be given for a processing procedure for communication processing in the image forming apparatus 101 for communication with the call-center terminal 102 via the relay server 103 in a case where a restart is prompted. In the flowchart shown in FIG. 4, a state is entered in which remote control processing is initiated and data reception is possible. The processing explained below is realized by a program stored in the HDD 204 being read out into the RAM 202, and executed by the CPU 201.

In step S601, the remote control processing module 306, transmits and receives, with the call-center terminal 102, audio, moving image, or remote control data via the network processing module 303 in the established session. In step S602, the remote control processing module 306 determines whether or not the data received in step S601 is a remote control instruction. The remote control instruction indicates data for performing a remote control other than that for audio and moving images. If the result of the determination is that it is a remote control instruction, the processing proceeds to step S604, and if not, the processing proceeds to step S603. In step S603, the remote control processing module 306 makes a request for performing a display such as for audio or a moving image, or the like, to the UI processing module 302.

Meanwhile, in step S604, the remote control instruction is received from the remote control processing module 306, the job control processing module 301 determines whether or not it is a restart instruction. The restart instruction is issued, in a case where a restart of the image forming apparatus 101 is necessary due to a modification of the device configuration or a setting modification because of the contents or circumstances of the trouble. Here, if there is the restart instruction, the processing proceeds to step S605, and if not the processing returns to step S601.

In step S605, the job control processing module 301 notifies the power supply processing module 307 of the restart instruction. The power supply processing module 307 determines whether the restart instruction is from the remote control processing module 306 or the restart instruction is the signal notified to the job control processing module 301 via the power supply I/F 213 from the power supply SW 214, and determines whether notification of processing of the job control processing module 301 is performed. That is, it is determined whether or not the restart instruction is made by remote control. If the restart instruction was made by remote control, the processing proceeds to step S606, and if not the processing proceeds to step S607. For example, if the restart instruction is notified of via the external network, it is determined that it is an instruction made by remote control.

Figure 8:
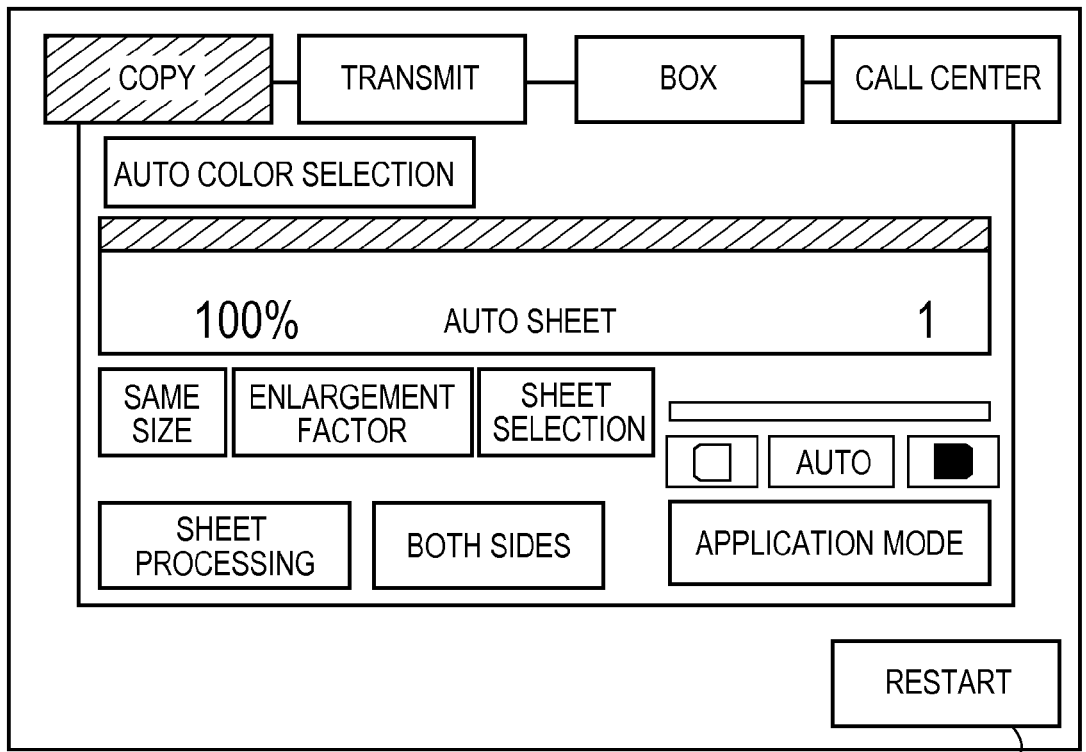
FIG. 8 is a view for illustrating a restart instructed from an operation unit in an embodiment.
Figure 9:
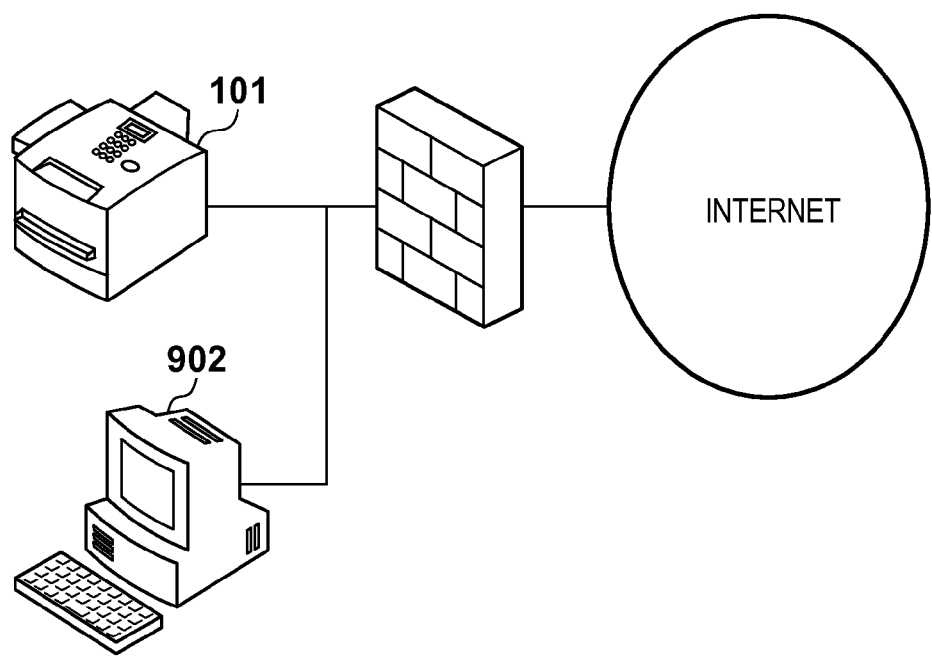
FIG. 9 is a view for illustrating a restart instructed from an operation unit in an embodiment.

Also, the job control processing module 301 is notified of the restart instruction in cases other than the remote control as shown in FIG. 8 and FIG. 9. In such a case the processing proceeds to step S607. More specifically, in FIG. 8, notification of a pressing of a restart button 801 is made from the operation unit 211, and via the UI processing module 302 the job control processing module 301 is notified of the restart. In other words, this is a restart instruction of which notification is made via a screen displayed on the operation unit 211 of the image forming apparatus 101. Also, in FIG. 9, a case of a restart notification of the job control processing module 301 via the network processing module 303 is shown. In the example of FIG. 9, an information terminal 902 placed in a local area network with the image forming apparatus 101 is comprised. By a restart instruction from the information terminal 902, the job control processing module 301 is notified of the restart via the network processing module 303. In other words, the restart instruction from the apparatus placed within the local area network is determined not to be a restart instruction by remote control.

Figure 6:
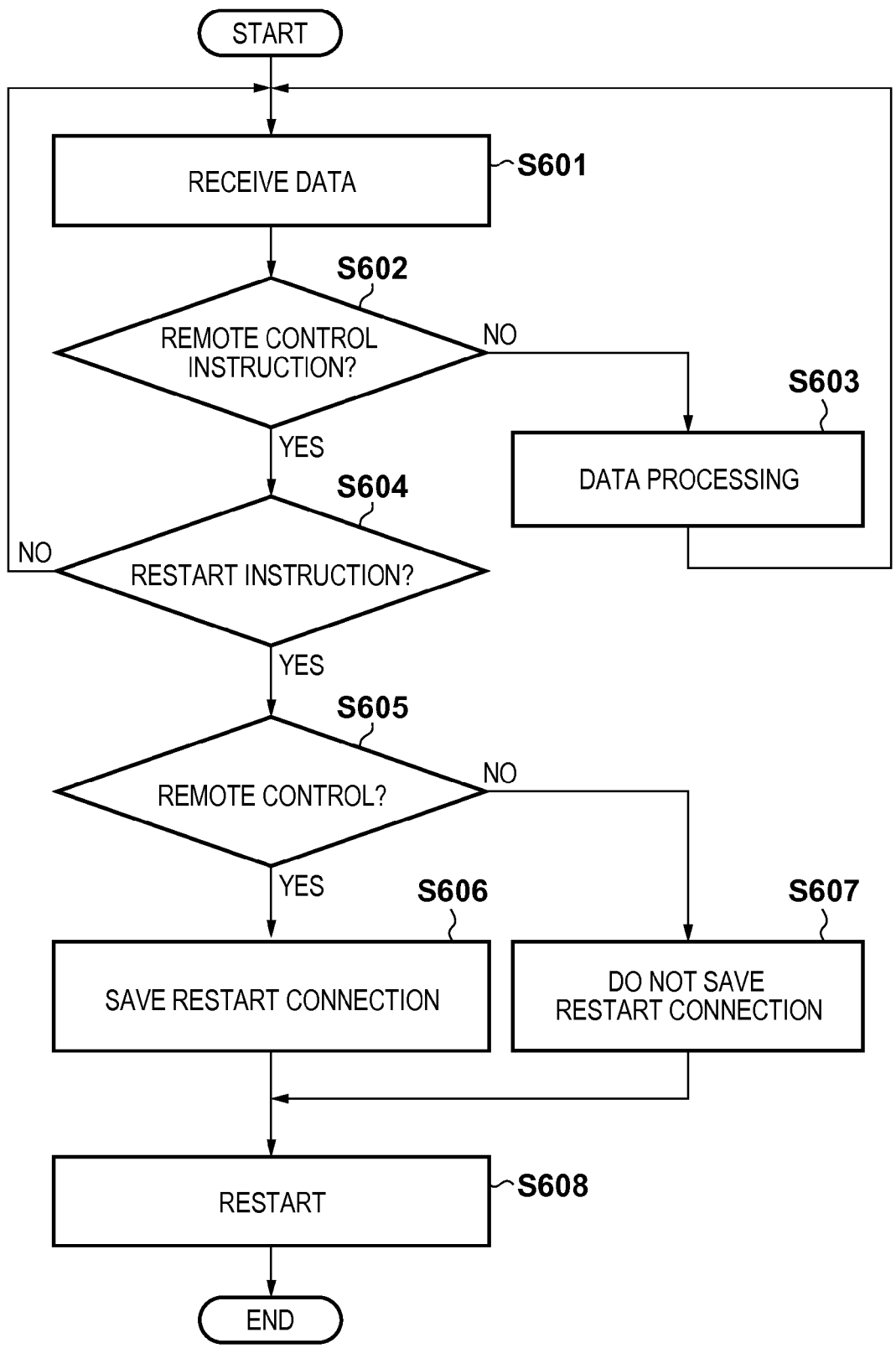
FIG. 6 is a view for illustrating a flowchart performed upon a remote control in an embodiment.

Explanation now returns to FIG. 6. If the processing is determined to have been performed by the remote control processing module 306, the job control processing module 301, in step S606, saves to the HDD (storage unit) 204 information necessary for activating the remote control processing module 306 upon the restart, and the processing proceeds to step S608. Meanwhile, if the processing is determined not to have be performed by the remote control processing module 306, the job control processing module 301, in step S607, does not store, into the HDD 204, the information necessary for activating the remote control processing module 306, and the processing proceeds to step S608. In step S608, the power supply processing module 307 executes the restart. In other words, in a case where the power supply processing module 307 stores the above described necessary information into the HDD 204, termination processing of the image forming apparatus 101 is executed after storing this information.

Figure 7A:
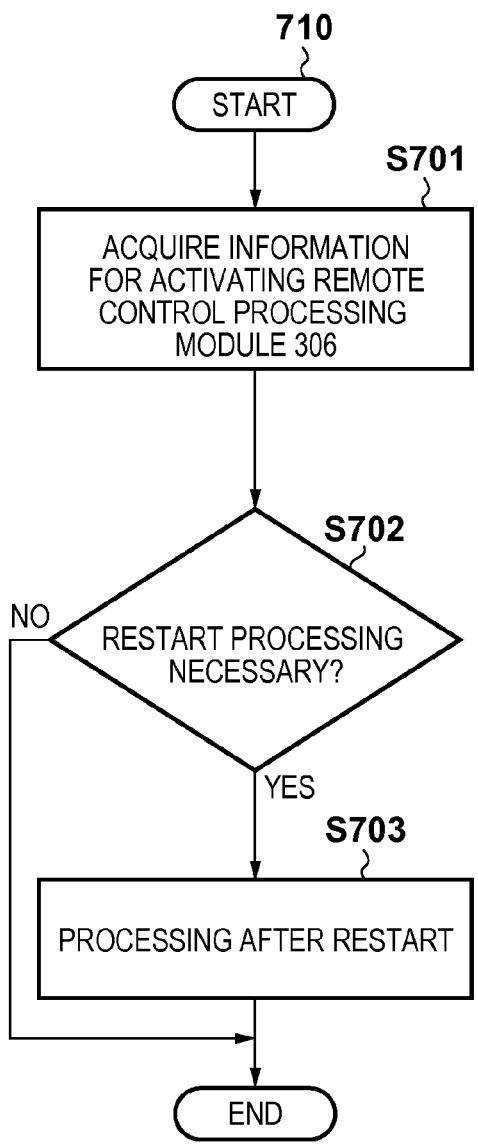
FIGS. 7A and 7B are views for illustrating flowcharts performed after a restart in an embodiment.

Continuing on, with reference to the flowchart of reference numeral 710 of FIG. 7A, explanation will be given for a processing procedure performed after the restart in the image forming apparatus 101. In FIG. 6, the sequence performed after the restart has been executed is shown. The processing explained below is realized by a program stored in the HDD 204 being read out into the RAM 202, and executed by the CPU 201.

In step S701, after the restart has been executed, the job control processing module 301 reads out from the HDD 204 information as to whether or not the remote control processing module 306 is activated from the HDD 204 and information necessary for the activation. The information read out here is the information saved in step S606 of FIG. 6. Accordingly, if the information is saved in the HDD 204, the remote control processing module 306 restarts. In step S702, the job control processing module 301 determines whether or not to activate the remote control processing module 306 based on whether or not the information could be acquired. In a case of activation, the processing proceeds to step S703, and when that is not the case, the process is terminated. In step S703, the job control processing module 301, in accordance with information read out from the HDD 204, activates the remote control processing module 306.

Figure 7B:
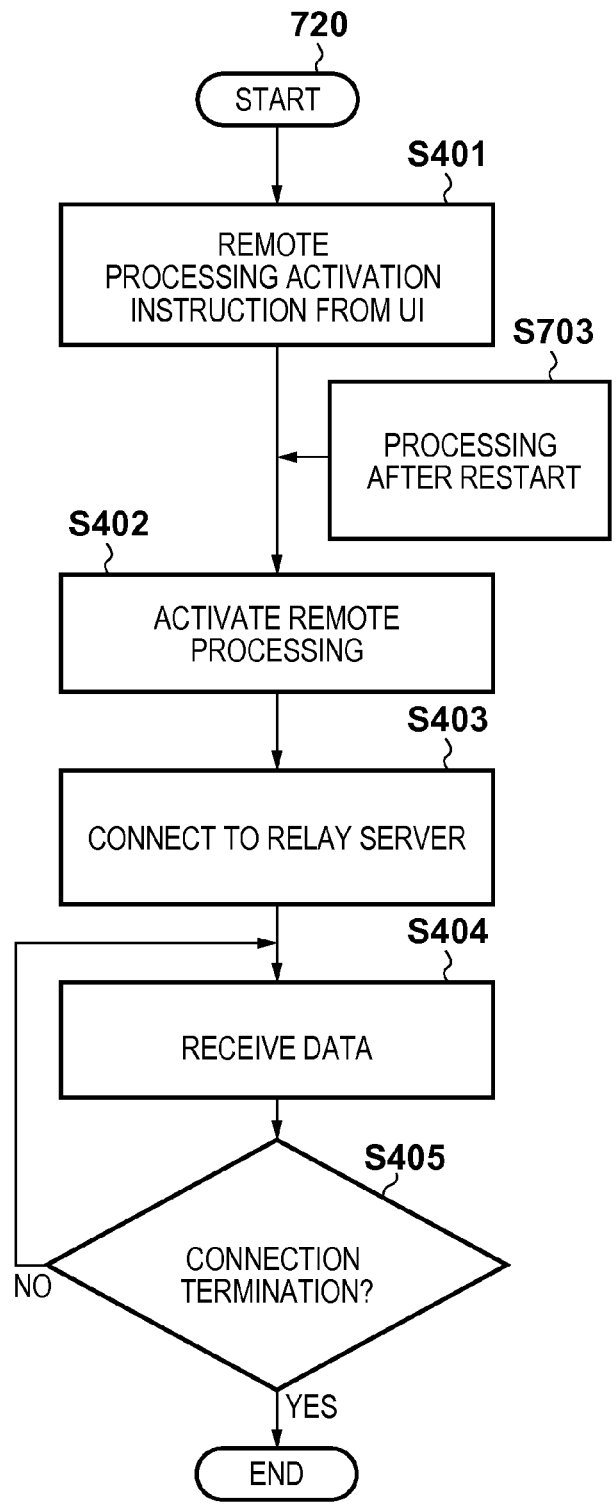

The flowchart of reference numeral 720 of FIG. 7B shows a communication processing procedure performed with the call-center terminal 102 via the relay server 103 after the restart in the image forming apparatus 101. In step S703 in reference numeral 710, it is shown that when the remote control processing module 306 is activated, the processing proceeds through step S402 and steps thereafter in the flowchart of the above described FIG. 4.

As explained above, in a case where the image forming apparatus 101, according to the embodiments, receives a restart instruction, it determines whether or not it is necessary to activate the remote control processing module 306 upon the restart by determining via which component the restart instruction is notified of. With this, by virtue of the present embodiment, an application associated with the remote control is activated after the restart only in a case where during a remote maintenance the restart instruction is designated by a remote control instruction, and so it is possible to prevent the activation of unnecessary applications.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-264504 filed on Dec. 20, 2013, which is hereby incorporated by reference herein in its entirety.

What is claimed is:

1. An image forming apparatus, comprising:
    a receiver configured to receive a restart instruction of the image forming apparatus;
    a memory device configured to store information relating to a remote control by an external apparatus in a case where the restart instruction is received from the external apparatus, and not to store the information in a case where the restart instruction is received from an operation unit provided in the image forming apparatus;
    a restart device configured to restart the image forming apparatus in accordance with the restart instruction; and
    a controller configured to control so as to not activate a remote application for remotely controlling the image forming apparatus from the external apparatus in a case where the information is not stored in the memory device, and so as to activate the remote application in a case where the information is stored in the memory device.

2. The image forming apparatus according to claim 1, wherein the controller executes apparatus termination processing after processing by the memory device has terminated.

3. The image forming apparatus according to claim 1, further comprising a determination device configured to determine whether or not the restart instruction received by the receiver is an instruction by remote control received from the external apparatus,
    wherein the determination device determines that the restart instruction is an instruction by remote control received from the external apparatus when notification of the restart instruction received by the receiver is made via an external network.

4. The image forming apparatus according to claim 1, wherein at least one of: an instruction of which notification is made via an operation interface of the image forming apparatus and an instruction from an apparatus within a local area network of the image forming apparatus, is included in the restart instruction in a case where the restart instruction is not an instruction by remote control received from the external apparatus.

5. A method of controlling an image forming apparatus, the method comprising steps of:
    receiving a restart instruction of the image forming apparatus;

storing, in a memory device, information relating to a remote control by an external apparatus in a case where the restart instruction is received from the external apparatus;

not storing, in the memory device, the information in a case where the restart instruction is received from an operation unit provided in the image forming apparatus;

restarting the image forming apparatus in accordance with the restart instruction; and controlling so as to not activate a remote application for remotely controlling the image forming apparatus from the external apparatus in a case where the information is not stored in the memory device, and so as to activate the remote application in a case where the information is stored in the memory device.

6. A non-transitory computer-readable storage medium storing a program that when executed causes a computer to perform a control method of an image forming apparatus, the control method comprising steps of:

receiving a restart instruction of the image forming apparatus;

storing, in a memory device, information relating to a remote control by an external apparatus in a case where the restart instruction is received from the external apparatus;

not storing, in the memory device, the information in a case where the restart instruction is received from an operation unit provided in the image forming apparatus;

restarting the image forming apparatus in accordance with the restart instruction; and controlling so as to not activate a remote application for remotely controlling the image forming apparatus from the external apparatus in a case where the information is not stored in the memory device, and so as to activate the remote application in a case where the information is stored in the memory device.

\* \* \* \* \*